United States Patent
Khan et al.

(10) Patent No.: US 10,355,772 B2
(45) Date of Patent: Jul. 16, 2019

(54) COMBINED SATELLITE AND TERRESTRIAL COMMUNICATION SYSTEM FOR TERMINALS LOCATED ON A VEHICLE SUCH AS AN AIRCRAFT USING A COMMON SET OF FREQUENCIES

(71) Applicant: Inmarsat Global Limited, London (GB)

(72) Inventors: Ammar Hussain Khan, London (GB); Antonio Franchi, London (GB)

(73) Assignee: Inmarsat Global Limited, London (GB)

( * ) Notice: Subject to any disclaimer, the term of this patent is extended or adjusted under 35 U.S.C. 154(b) by 134 days.

(21) Appl. No.: 15/123,519

(22) PCT Filed: Mar. 5, 2015

(86) PCT No.: PCT/GB2015/050645
§ 371 (c)(1),
(2) Date: Sep. 2, 2016

(87) PCT Pub. No.: WO2015/132600
PCT Pub. Date: Sep. 11, 2015

(65) Prior Publication Data
US 2018/0048380 A1    Feb. 15, 2018

(30) Foreign Application Priority Data
Mar. 5, 2014    (GB) .................................. 1403880.6

(51) Int. Cl.
*H04B 7/185* (2006.01)

(52) U.S. Cl.
CPC ..... *H04B 7/18508* (2013.01); *H04B 7/18513* (2013.01); *H04B 7/18539* (2013.01)

(58) Field of Classification Search
CPC ............ H04B 7/18508; H04B 7/18513; H04B 7/18539
USPC ......................................................... 455/427
See application file for complete search history.

(56) References Cited

U.S. PATENT DOCUMENTS

| | | |
|---|---|---|
| 6,684,057 B2 | 1/2004 | Karabinis |
| 7,039,400 B2 | 5/2006 | Karabinis et al. |
| 7,107,062 B2 | 9/2006 | Cruz et al. |
| 7,505,736 B2 | 3/2009 | Min |
| 7,587,171 B2 | 9/2009 | Evans et al. |
| 7,593,726 B2 | 9/2009 | Karabinis et al. |
| 8,031,646 B2 | 10/2011 | Karabinis |
| 8,442,519 B2 | 5/2013 | Cruz et al. |

(Continued)

FOREIGN PATENT DOCUMENTS

| | | |
|---|---|---|
| EP | 1052790 | 11/2000 |
| WO | WO 2013/056136 | 4/2013 |

*Primary Examiner* — Mong-Thuy T Tran
(74) *Attorney, Agent, or Firm* — Sterne, Kessler, Goldstein & Fox P.L.L.C.

(57) ABSTRACT

A combined satellite and terrestrial communication system may include at least one satellite earth station, for communication via a satellite with a plurality of terminals using one or more satellite links; a plurality of terrestrial stations, for communication with the plurality of terminals using one or more terrestrial links; wherein the satellite links overlap or coincide in frequency with the terrestrial links; and each of the terminals includes means for inhibiting interference between the satellite links and the terrestrial links.

20 Claims, 6 Drawing Sheets

(56) References Cited

U.S. PATENT DOCUMENTS

| | | |
|---|---|---|
| 2003/0054760 A1 | 3/2003 | Karabinis |
| 2003/0054814 A1 | 3/2003 | Karabinis et al. |
| 2005/0208890 A1* | 9/2005 | Karabinis .......... H04B 7/18513 455/12.1 |
| 2006/0030311 A1 | 2/2006 | Cruz et al. |
| 2006/0040612 A1 | 2/2006 | Min |
| 2006/0194576 A1 | 8/2006 | Karabinis et al. |
| 2006/0205346 A1 | 9/2006 | Evans et al. |
| 2006/0270470 A1* | 11/2006 | de la Chapelle ..... B64C 1/1492 455/575.5 |
| 2007/0178833 A1* | 8/2007 | Wahlberg ............... H04B 7/195 455/12.1 |
| 2008/0287124 A1 | 11/2008 | Karabinis |
| 2009/0021424 A1* | 1/2009 | Wahlberg ........... H04B 7/18536 342/352 |
| 2009/0034448 A1* | 2/2009 | Miller ................ H04B 7/18534 370/316 |
| 2010/0157857 A1 | 6/2010 | Ku et al. |
| 2011/0263199 A1 | 10/2011 | Cruz et al. |
| 2013/0044611 A1* | 2/2013 | Jalali ................. H04B 7/18508 370/252 |
| 2013/0182790 A1* | 7/2013 | Jalali ....................... H01Q 3/24 375/285 |
| 2013/0303080 A1* | 11/2013 | Moreno ................ H04J 11/004 455/9 |

* cited by examiner

COMBINED SATELLITE AND TERRESTRIAL COMMUNICATION SYSTEM FOR TERMINALS LOCATED ON A VEHICLE SUCH AS AN AIRCRAFT USING A COMMON SET OF FREQUENCIES

FIELD OF THE INVENTION

This invention relates to a combined satellite and terrestrial communication system in which spectrum is shared between the satellite and terrestrial components. Aspects of the invention include terminal, satellite base station, terrestrial base or ground station, network control and other apparatus for use in such a system.

BACKGROUND

Combined satellite and terrestrial communication systems are known as Complementary Ground Component (CGC) or Ancillary Terrestrial Component (ATC) systems. In such systems known in the art, the satellite and terrestrial systems generally operate within the same frequency spectrum. The terrestrial system may act as a 'repeater' to relay signals or channels also transmitted by the satellite systems to areas where satellite coverage is poor, such as built-up areas. Various operators have been licensed to operate such systems, but their implementation has been hampered by technical problems.

Sharing frequency spectrum between satellite and terrestrial systems gives rise to interference problems. One known technique for mitigating interference involves frequency division between the satellite and terrestrial components, such that the two components do not use the same frequencies at the same time in the same areas. This is, however, wasteful of bandwidth.

Another technique involves measuring the received signal strength or interference levels at one or more terminals, and adapting the system dynamically to avoid interference. For example, US-A-2010/0157857 discloses a technique where a terminal determines whether to communicate with the satellite or CGC systems depending on the signal strength received from the satellite system.

STATEMENT OF THE INVENTION

According to one aspect of the present invention, there is provided a combined satellite and terrestrial communication system comprising at least one satellite earth station, for communication via a satellite with a plurality of terminals using one or more satellite links; a plurality of terrestrial stations, for communication with the plurality of terminals using one or more terrestrial links; wherein the satellite links overlap or coincide in frequency with the terrestrial links; and each of the terminals includes means for inhibiting interference between the satellite links and the terrestrial links.

Aspects of the present invention are defined with reference to the accompanying claims.

BRIEF DESCRIPTION OF THE DRAWINGS

Embodiments of the invention will now be described, by way of example only, with reference to the accompanying drawings in which.

DESCRIPTION OF THE PREFERRED EMBODIMENTS

Figure 1:
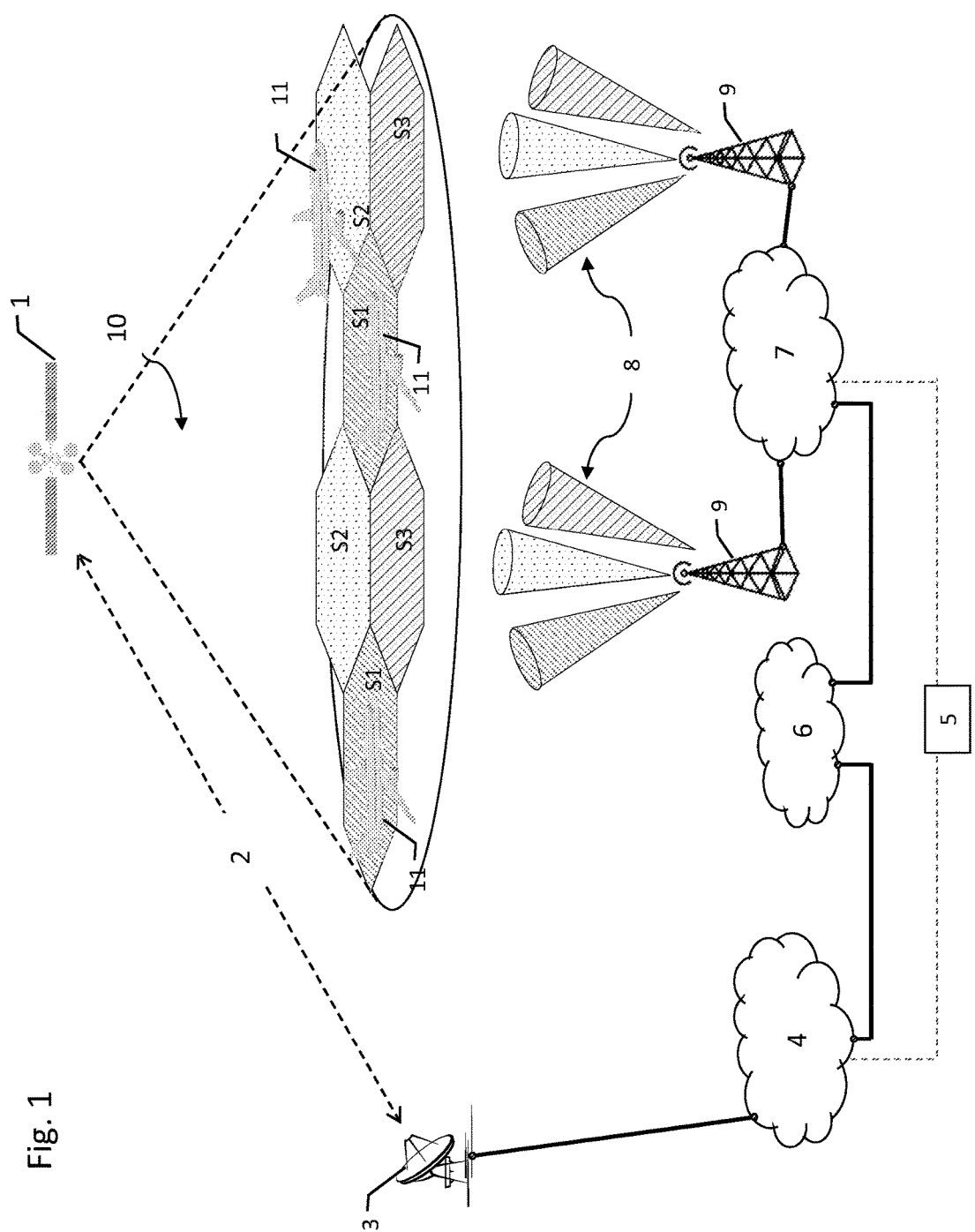
FIG. 1 is a schematic diagram of a combined satellite and terrestrial aeronautical communications system according to a first embodiment of the present invention.

In a system according to an embodiment of the present invention, a satellite 1 is connected via a bidirectional wireless feeder link 2 to a satellite earth station 3, and projects a beam 10 over an area of the earth's surface. The beam 10 may be one of a plurality of beams projected by the satellite 1 onto different areas of the earth's surface, for example to provide mobile satellite services (MSS). The satellite 1 may include one or more 'bent pipe' transponders, which map frequency channels within the feeder link 2 to different frequency channels within the beam(s) 10. In this embodiment, the beam 10 uses frequency channels within an allocated spectrum, such as within S-band. The feeder link 2 uses frequency channels within another allocated spectrum, such as within Ka-band, Ku band or any other suitable band. The satellite 1 may be a geostationary or geosynchronous satellite, such as the proposed Inmarsat S-band satellite.

A terrestrial CGC network 7 has a plurality of CGC ground stations 9. Each CGC ground station 9 projects a plurality of CGC beams 8 defining sectors S1, S2, S3. There may be more or fewer than 3 sectors. In this embodiment, each of the CGC beams 8 carries frequency channels in the same allocated spectrum; there is no frequency division between the CGC beams 8, and the allocated spectrum can be completely re-used within each CGC beam 8.

In this embodiment, the CGC ground stations 9 are designed for aeronautical communication and the communication terminals 14 are carried within aircraft 11. The beams 8 are directed upwards for communication with the aircraft 11.

The satellite earth station 3 is connected to a satellite ground network 4 which is in turn connected to a data network 6. The satellite ground network 4 is connected through the data network(s) 6 to the CGC network 7. CGC network 7 handles known cellular network operations, such as mobility management. Allocation of channels in the satellite network 4 and the CGC network 7 may be controlled by a Network Operations Centre (NOC) 5 or by a distributed management architecture with visibility and enforcement capabilities instead of the NOC 5. Alternatively, channels may be allocated independently within the satellite network 4 and the CGC network 7, without any central control or visibility.

Figure 2:
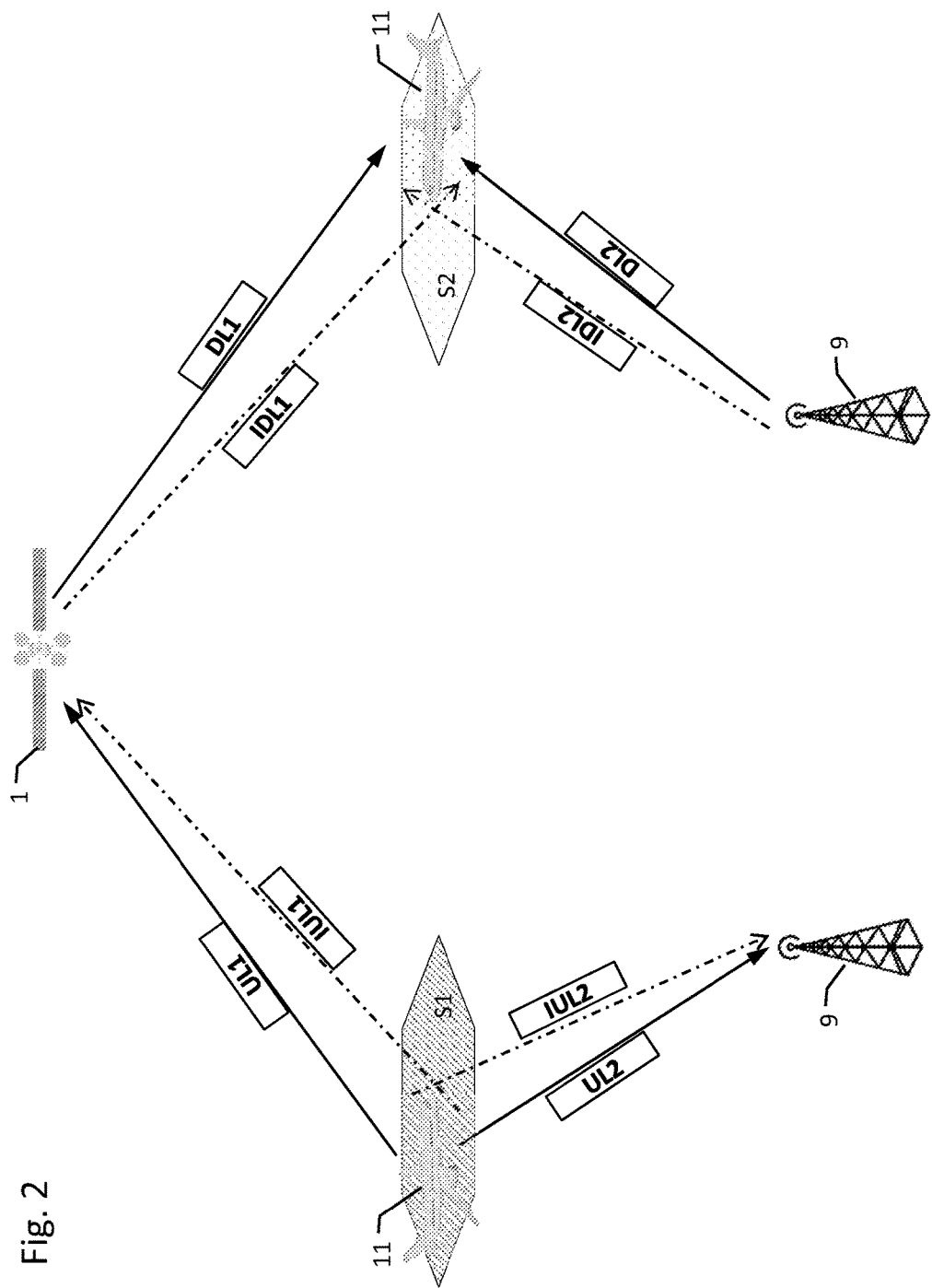
FIG. 2 is a diagram showing a signal and interference model in the first embodiment.
Figure 3:
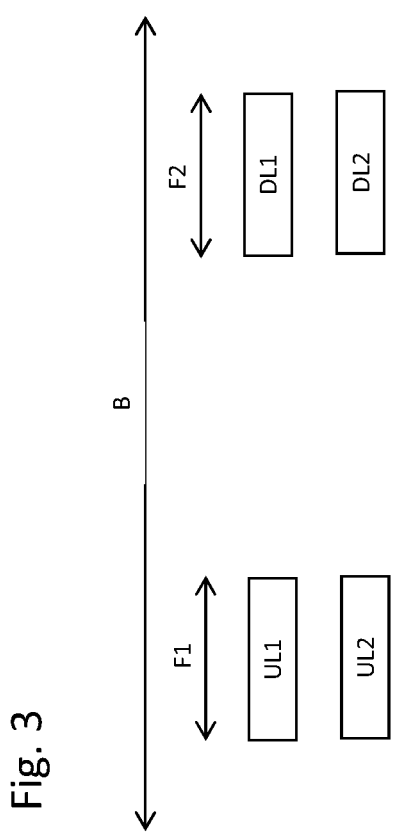
FIG. 3 is a diagram of frequency allocation in the first embodiment.

As shown in FIGS. 2 and 3, there is a different frequency spectrum allocation F1, F2 respectively between the uplink (UL), defined as transmissions from a terminal 14 to the satellite 1 or CGC ground station 9, and the downlink (DL), defined as transmission from the satellite 1 or CGC ground station 9. However, the satellite uplink UL1, from the terminal 14 to the satellite 1, uses some or all of the same frequencies F1 as the terrestrial uplink UL2, from the terminal 14 to the CGC ground station 9, without the need for coordination in frequency use between the satellite and CGC beams 10, 8. Likewise, the satellite downlink DL1, from the satellite 1 to the terminal 14, uses some or all of the same frequencies F2 as the terrestrial downlink DL2, from the terminal 14 to the CGC ground station 9, without the need for coordination in frequency use between the satellite and CGC beams 10, 8. The frequencies F1, F2 are within a frequency band B, such as S-band. In one example, the frequencies F1 and F2 are each of 15 MHz width.

Communication and signalling channels are defined within the frequencies F1, F2, according to an air interface definition of the satellite and CGC systems. As is known in the art, channels are divided substantially orthogonally by one or more of frequency, time slot, spread spectrum code, polarisation and other properties. The air interface may be different or similar between the satellite beam(s) 10 and the CGC beams 8. The air interface of the CGC beams may be Long Term Evolution (LTE). One or more channels may be allocated to each terminal 14.

Each CGC ground station 9 may cover a cell of approximately 90-150 km radius, divided into the three sectors S1, S2, S3. Europe-wide coverage may be provided by up to 500 CGC ground stations 9. The number and size of cells and sectors depends on the target coverage area, and the expected level of traffic and target capacity.

Figure 4:
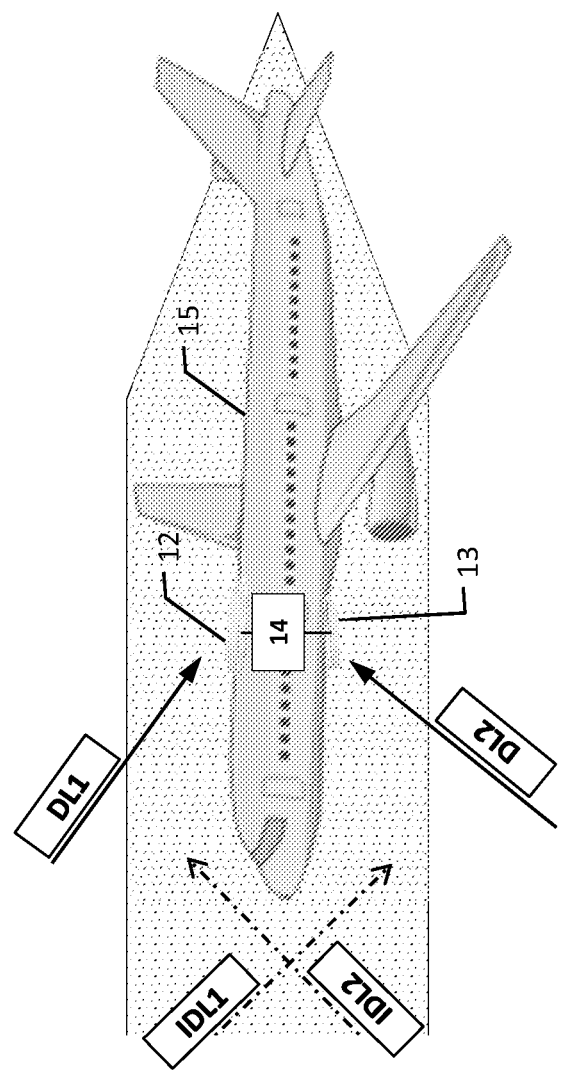
FIG. 4 is a schematic diagram of an aircraft for use in the embodiment.
Figure 5:
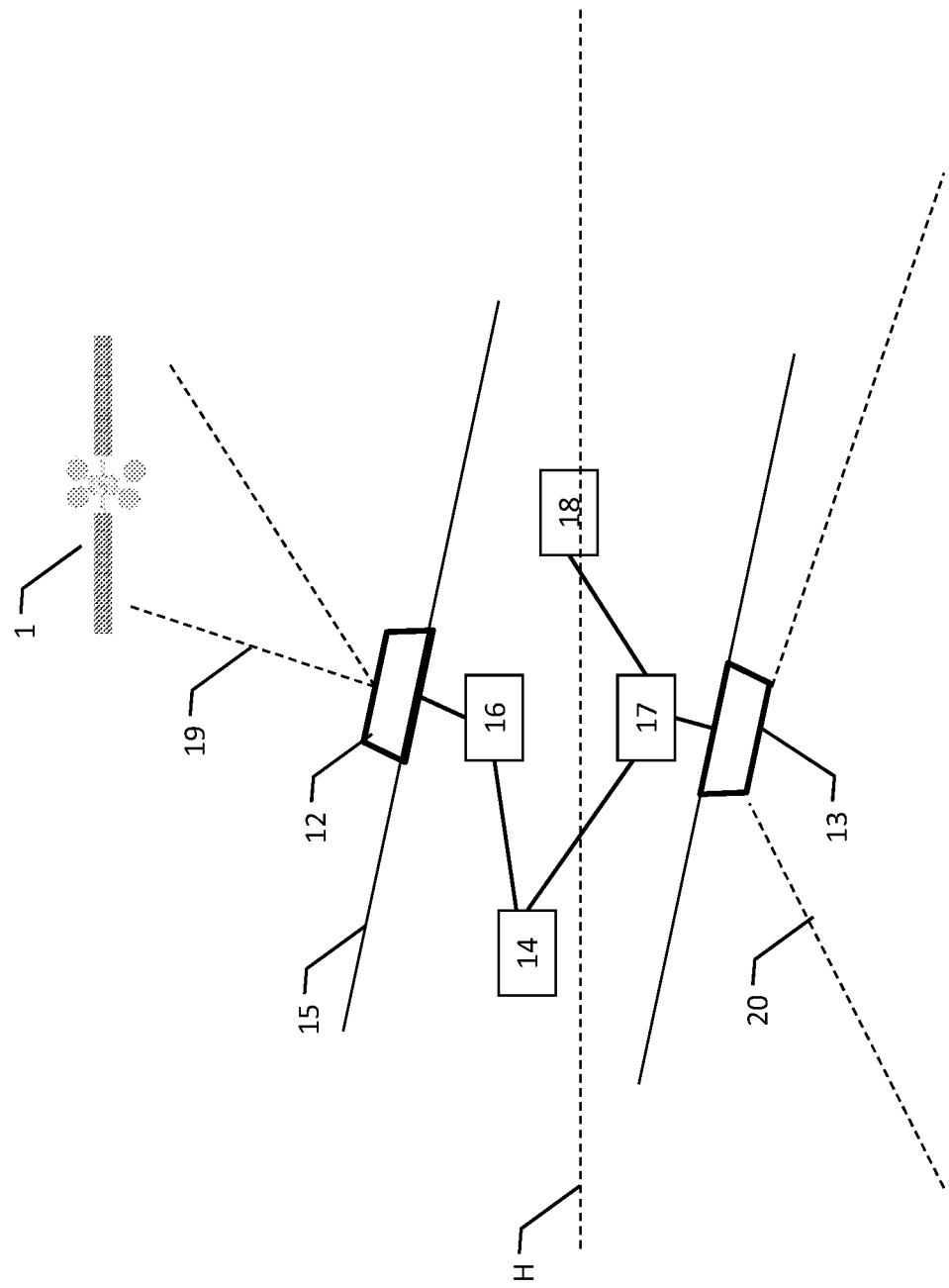
FIG. 5 is a schematic diagram of an active beam-steering or beam-forming arrangement in the first embodiment.

As shown in FIG. 4, each aircraft 11 has a satellite antenna or antenna set 12 located on an upper part of the fuselage 15, for communication with the satellite 1, and a terrestrial antenna or antenna set 13 located on a lower part of the fuselage 15, for communication with the CGC ground stations 9. Advantageously, the fuselage 15 provides substantial interference isolation between the satellite antenna 12 and the terrestrial antenna 13, due to the way that the uplink and downlink are defined. For example, the downlink interference IDL1 from the satellite 1 to the terrestrial antenna 13 is greatly attenuated relative to the satellite downlink DL1, from the satellite 1 to the satellite antenna 12. Likewise, the downlink interference IDL2 from the CGC ground station 9 to the satellite antenna 12 is greatly attenuated relative to the terrestrial downlink DL2 from the CGC ground station 9 to the terrestrial antenna 13.

This interference isolation allows the same frequencies to be used simultaneously in the satellite beam(s) 12 and CGC beams 8, without the need for coordination in frequency use. Also as a result of this interference isolation, different communication channels may be carried on the same frequencies F1, F2 between the satellite beam(s) 12 and the CGC beams 8. For example the satellite beam 10 may carry low bandwidth channels such as signalling channels or low data rate, high latency data channels or broadcasting channels. The CGC beams 8 may carry high data rate, low latency voice or data channels. Since the same frequencies can be re-used between the satellite beam(s) 12 and CGC beams 8, preferably simultaneously, much greater spectral efficiency can be achieved.

The communications terminal 14 may be connected to both the satellite antenna 12 and the terrestrial antenna 13, or a respective separate communication terminal 14 may be connected to each of the satellite antenna 12 and the terrestrial antenna 13.

The interference isolation is effective for the majority of the service area of the satellite 1, but is dependent on factors such as the flight path and instantaneous roll, pitch and/or yaw of the aircraft 11, the relative positions of the satellite 1 and the CGC ground stations 9, the aircraft's relative position to the CGC ground stations 9 and on the aircraft elevation angle with respect to the satellite 1. These factors, singly or in combination, may result in the interference signals not being blocked by the fuselage 15, leading to self-interference.

The directivity of one or more beam(s) 19 of the satellite antenna 12 and/or beam(s) 20 of the terrestrial antenna 13 may be controlled so as to mitigate the above factors. For example, the satellite antenna 12 may include an active beam-switching or beam-steering controller 16 arranged to direct the active beam(s) 19 towards the satellite 1, for example based on detected signal level. Alternatively, the beam(s) 19 may be directed above a reference horizon H of the aircraft 11, or at a satellite position determined relative to the reference horizon H.

The terrestrial antenna 13 may include a beam-switching or beam-steering controller 17 to direct the active beam(s) 20 towards the CGC ground stations 9, for example based on detected signal level. Alternatively, the active beam(s) 20 may be directed below a reference horizon H of the aircraft 11. The reference horizon H may be derived by an artificial horizon detector 18 provided within the aircraft control systems. This arrangement avoids interference to or from the satellite 1, without the need to track the positions or signals of the CGC ground stations 9.

The terrestrial antenna 13 and/or satellite antenna 12 may be mechanically, electromagnetically and/or electronically steered, and may each comprise one or more antenna elements. The terrestrial antenna 13 and/or the satellite antenna 12 may comprise a multi-beam antenna, with the beams independently steerable. Each aircraft 11 may have more than one terrestrial antennas 13 and/or satellite antennas 12, located at different positions on the aircraft 11, for example to provide reception and/or transmission diversity.

The above arrangements may actively suppress interference between the satellite uplink UL1 and the terrestrial uplink UL2, and between the satellite downlink DL1 and the terrestrial downlink DL2.

Interference between the satellite and terrestrial components may be reduced by signal cancellation. For example, where a terminal 14 receives satellite downlink DL1 through the satellite antenna 12 and satellite downlink interference IDL1 through the terrestrial antenna 13, there is a correlation between the two signals which may be used to cancel the downlink interference IDL1 from the terrestrial downlink DL2 received through the terrestrial antenna 13. Likewise, the terminal 14 may cancel the terrestrial downlink interference IDL2 from the satellite downlink DL1.

The satellite earth station 3, or another node connected thereto, may cancel the satellite uplink interference IUL1 from the satellite uplink UL1, either by receiving information on the terrestrial uplink UL2 via the CGC ground station 9, or simply by decoding and cancelling the satellite uplink interference IUL1.

The CGC ground station 9, or another node connected thereto, may cancel the terrestrial uplink interference IUL2 from the terrestrial uplink UL2, either by receiving information on the satellite uplink UL1 via the satellite earth station 3, or simply by decoding and cancelling the terrestrial uplink interference IUL2.

Figure 6:
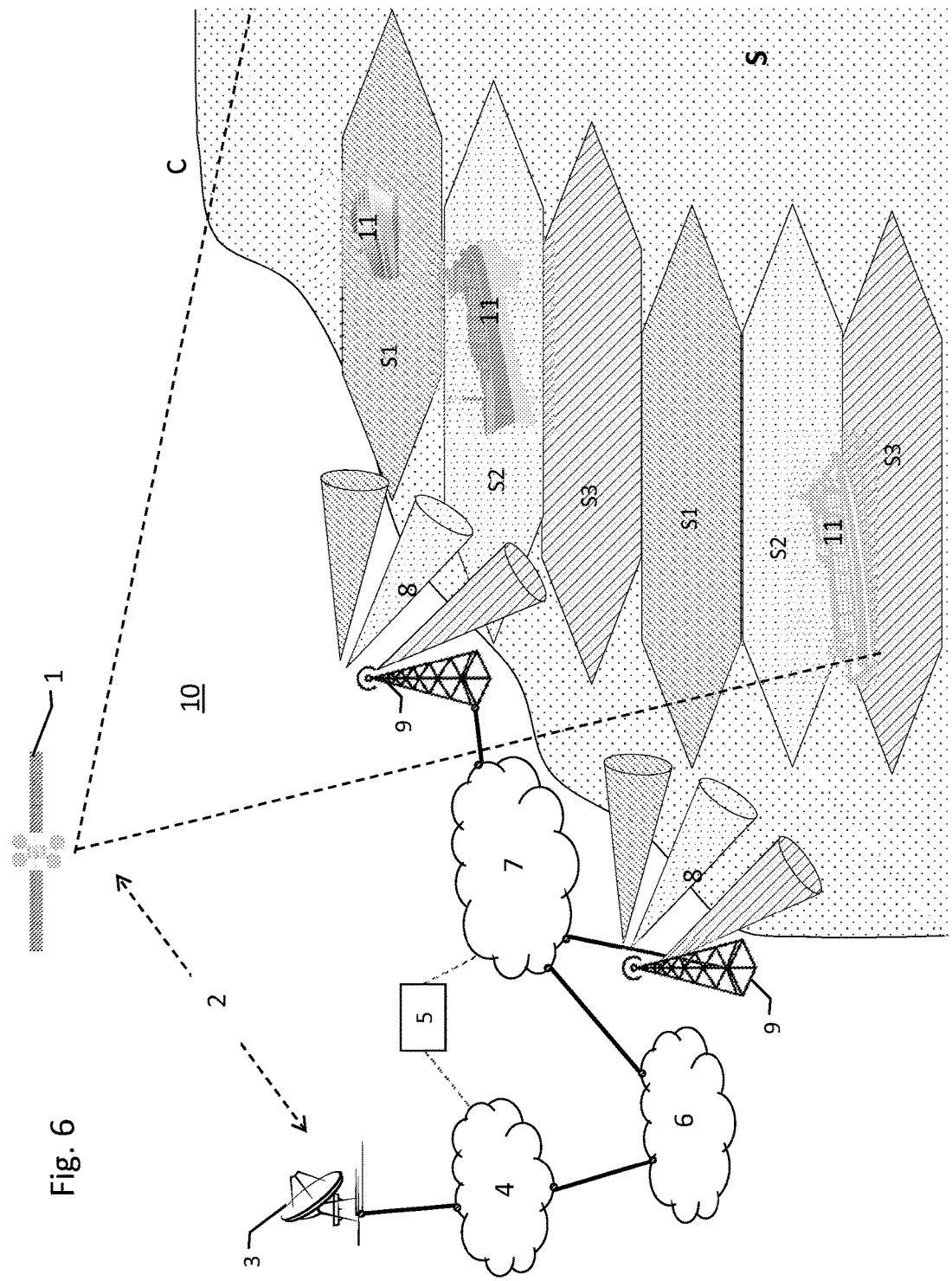
FIG. 6 is a schematic diagram of a combined satellite and terrestrial maritime communications system according to a second embodiment of the present invention.

FIG. 6 shows a second embodiment which is similar to the first embodiment, but applied to a maritime environment. Similar parts between the embodiments are indicated by the same reference numerals. In the second embodiment, the CGC ground stations 9 are coastal or marine CGC stations generating beams 8 directed substantially horizontally, so as to provide CGC channels for maritime terminals 14, for example in vessels 11. The beams 8 define sectors S1, S2, S3 at or around sea level, around the coastline C or further out to sea S, depending on the area desired to be covered, and the potential coverage area of the CGC ground stations 9.

In the second embodiment, the satellite beam 19 may be directed towards the satellite 1 as in the first embodiment. However, the terrestrial beam controller 17 on a vessel 11 may direct the terrestrial beam(s) 20 towards the coast and/or the horizon H, so as to compensate for pitching or rolling of the vessel 11.

The vessel 11 may provide less isolation between the satellite antenna 12 and the terrestrial antenna 13 than in the first embodiment, although the superstructure of the vessel 11 may provide some isolation, depending on the antenna installation. Nevertheless, active beam steering and/or interference cancellation may reduce interference, as in the first embodiment.

In an alternative embodiment comprising a terrestrial system, the CGC ground stations 9 may be fixed or mobile, and may generate substantially horizontal beams for transmission to and/or reception from terrestrial terminals 14, for example portable or vehicle based terminals. The terrestrial beam controller 17 may direct the active beams horizontally.

The satellite beam 10 may be steered, shaped or include nulls so as to avoid areas of high interference with the CGC beams 8.

Many alternative embodiments may be envisaged, which nevertheless fall within the scope of the invention as defined by the claims. It is understood that protection is sought hereby for any and all novel subject matter and combinations thereof disclosed herein. Unless the contrary is stated, features of each embodiment may be combined with features of any other.

Alternative statements of invention are recited below as numbered clauses.

1. A combined satellite and terrestrial communication system, comprising: at least one satellite earth station (3), for communication via a satellite (1) with a plurality of terminals (14) using one or more satellite links (UL1, DL1); a plurality of terrestrial stations (9), for communication with the plurality of terminals (14) using one or more terrestrial links (UL2, DL2); wherein at least some of the frequencies (F1, F2) used in the satellite links (UL1, DL1) coincide with the frequencies (F1, F2) of the terrestrial links (UL2, DL2); and each of the terminals (14) is arranged to inhibit interference between the coincident frequencies of the satellite links and the terrestrial links.
2. The system of clause 1, wherein the satellite links include a satellite uplink (UL1), for transmissions from the terminals (14) to the satellite (1), and the terrestrial links include a terrestrial uplink (UL2), for transmissions from the terminals (14) to the terrestrial stations (9), wherein at least some of frequencies (F1, F2) of the satellite uplink (UL1) coincide with the frequencies (F1, F2) of the terrestrial uplink (UL2).
3. The system of clause 1 or clause 2, wherein the satellite links include a satellite downlink (DL1), for transmissions to the terminals (14) from the satellite (1), and the terrestrial links include a terrestrial downlink (DL2), for transmissions to the terminals (14) from the terrestrial stations (9), wherein at least some of the frequencies (F1, F2) of the satellite downlink (DL1) coincide with the frequencies (F1, F2) of the terrestrial downlink (DL2).
4. The system of any preceding clause, wherein at least some of the terminals (14) include an interference canceller or arranged to cancel, from the satellite downlink (DL1), interference (IDL2) from the terrestrial downlink (DL2), and/or to cancel, from the terrestrial downlink (DL2), interference (IDL1) from the satellite downlink (DL1).
5. The system of any preceding clause, wherein the satellite earth station (3), or a node connected thereto, includes an interference canceller or arranged to cancel, from the satellite uplink (UL1), interference (IUL1) from the satellite uplink (UL2).
6. The system of any preceding clause, wherein at least one of the terrestrial stations (9), or a node connected thereto, includes an interference canceller or arranged to cancel, from the terrestrial uplink (UL2), interference (IUL2) from the satellite uplink (UL1).
7. The system of any preceding clause, wherein the channels within the satellite links are allocated independently from channels within the terrestrial links.
8. The system of any preceding clause, wherein each of the terrestrial stations (9) generates a plurality of beams (8) defining different sectors (S1, S2, S3).
9. The system of clause 8, wherein the frequencies (F1, F2) are re-used between each of the plurality of beams (8).
10. The system of any preceding clause, wherein the terminals (14) are each mounted in or on a respective vehicle (11) having at least one satellite antenna (12), for communication with the satellite (1), and at least one terrestrial antenna (13), for communication with the terrestrial stations (9).
11. The system of clause 10, wherein the vehicle (11) provides interference isolation between the satellite antenna (12) and the terrestrial antenna (13).
12. The system of clause 11, wherein the vehicle is an aircraft (11), the satellite antenna (12) is positioned on an upper side of a fuselage (15) of the aircraft (11) and the terrestrial antenna (13) is positioned on a lower side of the fuselage (15).
13. The system of clause 10 or 11, wherein the vehicle is a maritime vessel (11).
14. The system of any one of clauses 10 to 13, wherein the satellite antenna (12) is arranged to generate one or more beams (19) directed so as to inhibit interference to or from the terrestrial stations (9).
15. The system of clause 14, wherein the one or more beams (19) generated by the satellite antenna (12) are directed towards the satellite (1).
16. The system of clause 14 or clause 15, wherein the one or more beams (19) generated by the satellite antenna (12) are directed above, or with reference to, a horizon (H).
17. The system of any one of clauses 10 to 16, wherein the terrestrial antenna (13) generates one or more beams (20) directed so as to inhibit interference to or from the satellite (1).
18. The system of clause 17, wherein the one or more beams generated by the terrestrial antenna (13) are directed towards, below, or with reference to, a horizon (H).
19. The system of clause 18, wherein the vehicle (11) includes a horizon detector (18) and a beam controller (17) responsive to the horizon detector (18) so as to direct the one or more beams generated by the terrestrial antenna (13).
20. The system of clause 18 or 19, wherein the vehicle is an aircraft (11) and the one or more beams generated by the terrestrial antenna (13) are directed below the horizon (H).

21. The system of clause 17, wherein the one or more beams generated by the terrestrial antenna (13) are directed towards one or more ground stations (9).
22. A vehicle for use in the system of any one of clauses 10 to 21.
23. A satellite earth station (3), or a node connected thereto, for use in the system of any one of clauses 10 to 21.
24. A terrestrial station, or a node connected thereto, for use in the system of any one of clauses 10 to 21.
25. A method of operating the system of any one of clauses 1 to 21, in which method the terrestrial frequencies and satellite frequencies are allocated without coordination therebetween.

What is claimed is:

1. A combined satellite and terrestrial communication system, comprising:
at least one satellite earth station, for communication via a satellite with a plurality of terminals using one or more satellite links; and
a plurality of terrestrial stations, for communication with the plurality of terminals using one or more terrestrial links; wherein the satellite links include a satellite uplink, for transmissions from the terminals to the satellite, and the terrestrial links include a terrestrial uplink, for transmissions from the terminals to the terrestrial stations, wherein at least some of frequencies of the satellite uplink coincide with, and are used simultaneously with, the frequencies of the terrestrial uplink,
wherein the terminals are each provided in or on a respective vehicle having at least one satellite antenna, for communication with the satellite, and at least one terrestrial antenna, for communication with the terrestrial stations, such that interference is attenuated between the satellite and terrestrial antennas such that interference between the satellite uplink and the terrestrial uplink is suppressed, and
wherein at least part of the body of the respective vehicle provides interference isolation between the satellite antenna and the terrestrial antenna.

2. The system of claim 1, wherein the respective vehicle provides interference isolation between the satellite antenna and the terrestrial antenna.

3. The system of claim 1, wherein the respective vehicle is an aircraft, the satellite antenna is positioned on an upper side of a fuselage of the aircraft and the terrestrial antenna is positioned on a lower side of the fuselage.

4. The system of claim 1, wherein one or more beams generated by the terrestrial antenna are directed towards, below, or with reference to, a horizon.

5. The system of claim 4, wherein the vehicle includes a horizon detector and a beam controller responsive to the horizon detector so as to direct the one or more beams generated by the terrestrial antenna.

6. The system of claim 4, wherein the one or more beams generated by the terrestrial antenna are directed towards one or more ground stations.

7. The system of claim 1, wherein the one or more beams generated by the satellite antenna are directed above, or with reference to, a horizon.

8. The system of claim 1, wherein the terrestrial antenna generates one or more beams directed so as to inhibit interference to or from the satellite.

9. The system of claim 1, wherein at least some of the terminals are arranged to cancel, from the satellite downlink, interference from the terrestrial downlink, and/or to cancel, from the terrestrial downlink, interference from the satellite downlink.

10. The system of claim 1, wherein the channels within the satellite links are allocated independently from channels within the terrestrial links.

11. The system of claim 1, wherein each of the terrestrial stations generates a plurality of beams defining different sectors.

12. The system of claim 11, wherein the frequencies are re-used between each of the plurality of beams.

13. The system of claim 1, wherein the satellite antenna is arranged to generate one or more beams directed so as to inhibit interference to or from the terrestrial stations.

14. The system of claim 13, wherein the one or more beams generated by the satellite antenna are directed towards the satellite.

15. A vehicle arranged for use in the system of claim 1.

16. A satellite earth station, or a node connected thereto, for use in the system of claim 1.

17. A terrestrial station, or a node connected thereto, for use in the system of claim 1.

18. A combined satellite and terrestrial communication system, comprising:
at least one satellite earth station, for communication via a satellite with a plurality of terminals using one or more satellite links; and
a plurality of terrestrial stations, for communication with the plurality of terminals using one or more terrestrial links,
wherein the satellite links include a satellite downlink, for transmissions to the terminals from the satellite, and the terrestrial links include a terrestrial downlink, for transmissions to the terminals from the terrestrial stations, wherein at least some of the frequencies of the satellite downlink coincide with, and are used simultaneously with, the frequencies of the terrestrial downlink,
wherein the terminals are each provided in or on a respective vehicle having at least one satellite antenna, for communication with the satellite, and at least one terrestrial antenna, for communication with the terrestrial stations, such that interference is attenuated between the satellite and terrestrial antennas such that interference between the satellite uplink and the terrestrial uplink is suppressed, and
wherein at least part of the body of the respective vehicle provides interference isolation between the satellite antenna and the terrestrial antenna.

19. The system of claim 18, wherein the satellite earth station, or a node connected thereto, is arranged to cancel, from the satellite uplink, interference from the terrestrial uplink.

20. The system of claim 18, wherein at least one of the terrestrial stations, or a node connected thereto, is arranged to cancel, from the terrestrial uplink, interference from the satellite uplink.

* * * * *

UNITED STATES PATENT AND TRADEMARK OFFICE
CERTIFICATE OF CORRECTION

PATENT NO. : 10,355,772 B2  
APPLICATION NO. : 15/123519  
DATED : July 16, 2019  
INVENTOR(S) : Ammar Hussain Khan et al.

Page 1 of 1

It is certified that error appears in the above-identified patent and that said Letters Patent is hereby corrected as shown below:

In the Specification

In Column 3, Lines 43 and 47, delete "satellite beam(s ) 12" and insert --satellite beam(s ) 10--

In the Claims

In Column 8, Line 48 and Line 49, delete "uplink" and insert --downlink--  
In Column 8, Line 53, delete "claim 18" and insert --claim 1--  
In Column 8, Line 57, delete "claim 18" and insert --claim 1--

Signed and Sealed this  
Twenty-fifth Day of February, 2020

Andrei Iancu  
*Director of the United States Patent and Trademark Office*